United States Patent [19]

Johnson

[11] Patent Number: 4,575,189

[45] Date of Patent: Mar. 11, 1986

[54] BICYCLE REFLECTOR SAFETY DEVICE

[76] Inventor: William M. Johnson, P.O. Box 70404, Eugene, Oreg. 97401

[21] Appl. No.: 710,976

[22] Filed: Mar. 12, 1985

[51] Int. Cl.⁴ .............................................. B60Q 1/34
[52] U.S. Cl. .................................. 350/99; 116/35 A; 116/53; 280/289 R
[58] Field of Search ...................... 116/35 A, 53, 173; 280/289 R; 301/375 A; 350/97, 99, 100

[56]  References Cited

U.S. PATENT DOCUMENTS

| | | | |
|---|---|---|---|
| 3,944,255 | 3/1976 | Martinson | 280/289 R |
| 3,967,575 | 7/1976 | Coutts | 280/289 R |
| 3,972,302 | 8/1976 | Sherman | 116/28 R |
| 4,116,154 | 9/1978 | Harris | 350/99 |
| 4,321,883 | 3/1982 | Rupps | 350/97 |
| 4,483,586 | 11/1984 | Sisto | 350/99 |

Primary Examiner—Bruce Y. Arnold
Assistant Examiner—William Propp
Attorney, Agent, or Firm—John F. Ingman

[57]  ABSTRACT

A bicycle reflector safety warning device which embodies reflectors, oriented for viewing from both forward and rearward of the bicycle, on both sides of the bicycle, so as to define the outside dimensions on both sides of the bicycle and to provide a lateral separation basis for the estimation of distance to the bicycle. The device, of sturdy construction, may include a mounting member for secure attachment to the bicycle seat stays; a single helical expansion spring member for flexibility and resiliency; reflector support rods attached helically, by threads, to the spring member for ruggedness and adjustability; and forward and rearward pairs of reflectors.

6 Claims, 3 Drawing Figures

BICYCLE REFLECTOR SAFETY DEVICE

BACKGROUND OF THE INVENTION

1. Field of the Invention

The present invention generally relates to bicycle warning safety devices, and more particularly, is concerned with a bicycle reflector safety device with resiliently mounted reflectors which extend outwardly on both sides of the bicycle and provide warning to both the front and the rear.

2. Description of the Prior Art

A common safety device for the protection of a bicycle and its rider from being struck by a motor vehicle at night, or in fog, or during other times of reduced visibility, is a single red reflector mounted on the seat, the rear frame, or possibly, if a full rear fender exists, on the rear of that fender. The reflector is positioned to be seen from the rear of the bicycle and generally indicates the center of the bicycle. This centered reflector does nothing to define the outside dimensions of the bicycle and rider, nor is it very helpful in estimating the distance from the bicycle.

A number of bicycle warning systems have been developed which extend a rearward oriented reflector out from the bicycle on the road side, so as to indicate the road-side location which must be avoided by a motor vehicle approaching from the rear so as not to strike the bicycle and rider.

As noted above, bicycle reflector systems generally are designed to provide warning in the rearward direction. Yet, as is commonly recognized, some bicycle operators, especially the younger variety, may disobey traffic rules and regulations. Sometimes they ride on the wrong side of a street or road so that they, in fact, face the traffic. There is a need, therefore, for effective reflective safety warning to the front of the bicycle, as well as to the rear.

There also is a need in a bicycle safety warning device for reflectors to extend out from both sides of the bicycle, thereby defining the dimensions of the cyclist and bicycle on both sides of the bicycle. Then, in conjunction with an effective front reflector warning system, there would be a road-side dimension-defining warning, regardless of whether the cyclist is travelling with or against the prevailing motor vehicle traffic.

Reflectors located out and away from both sides of the bicycle also would provide another valuable and needed function. Such reflectors would provide a basis for an automobile or truck operator to estimate the distance he is away from a cyclist. As is commonly appreciated by vehicle operators who drive at night, the relative position or separation of points of light (or reflected light) gives an indication of the distance away from the lights; i.e., as one approaches laterally spaced lights, these lights will appear to separate further the closer one gets. A good example of this effect on the highway are the tail lights of automobiles. A similar effect would be available for bicycles with reflectors which are spaced laterally on the bicycle. An automobile or truck operator, on viewing such a combination of reflected light, would immediately be able to make a judgment on the distance to the cyclist and thus what evasive action, if any, is necessary. A single reflector system, whether centered or extended to the road side of the bicycle, does not provide as effectively a measure of distance to the bicycle.

What is needed is a bicycle safety warning device which:

(1) extends on both sides of a bicycle so as to define the side dimensions of the bicycle and rider, and also to provide a basis for the estimation of distance from the bicycle;

(2) provides an effective reflector system, on both sides of the bicycle, oriented towards the front of the bicycle as well as towards the rear;

(3) is of rugged construction, and is preferably flexibly and resiliantly mounted on the bicycle so that the striking of the reflector or supporting member will not appreciably damage either the object struck or the device itself, nor dislodge any component of the safety device; and (4) simplicity of manufacture and low cost, so as to assure its availability and use.

SUMMARY OF THE INVENTION

The present invention provides a bicycle safety warning device designed to satisfy the aforementioned needs. The invention embodies a ruggedly constructed bicycle reflector safety warning device which extends reflectors, oriented for viewing from both forward and rearward of the bicycle, on both sides of the bicycle, so as to define the outside dimensions on both sides of the bicycle, and to provide a lateral separation basis for the estimation of distance to the bicycle.

Accordingly, the present invention may involve a mounting member for attachment to the frame seat stays of the bicycle below the seat thereof; a single spring member securely attached by clamping to and by the mounting member, which provides flexibilty and resiliency to the device; reflector support rods attached helically by threads, for ruggedness and adjustability, to the spring element; and finally, reflectors which are attached to the outer ends of the reflector support rods, with non-red forward reflectors oriented to the front and red rearward reflectors oriented to the rear of the bicycle. The bicycle reflector safety warning device is designed so that the reflectors are separated laterally to equal or exceed the outside lateral dimensions of the bicycle.

DESCRIPTION OF THE PREFERRED EMBODIMENT

Figure 1:
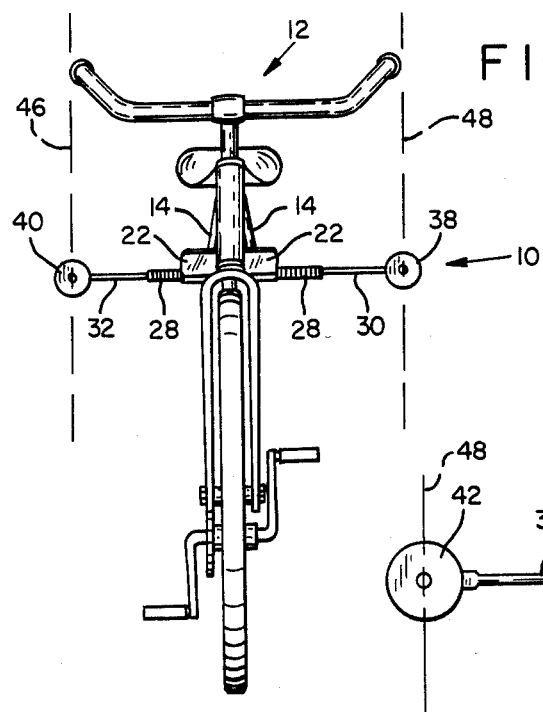
FIG. 1 is a perspective view of the invention mounted on a bicycle, as viewed from the front.
Figure 2:
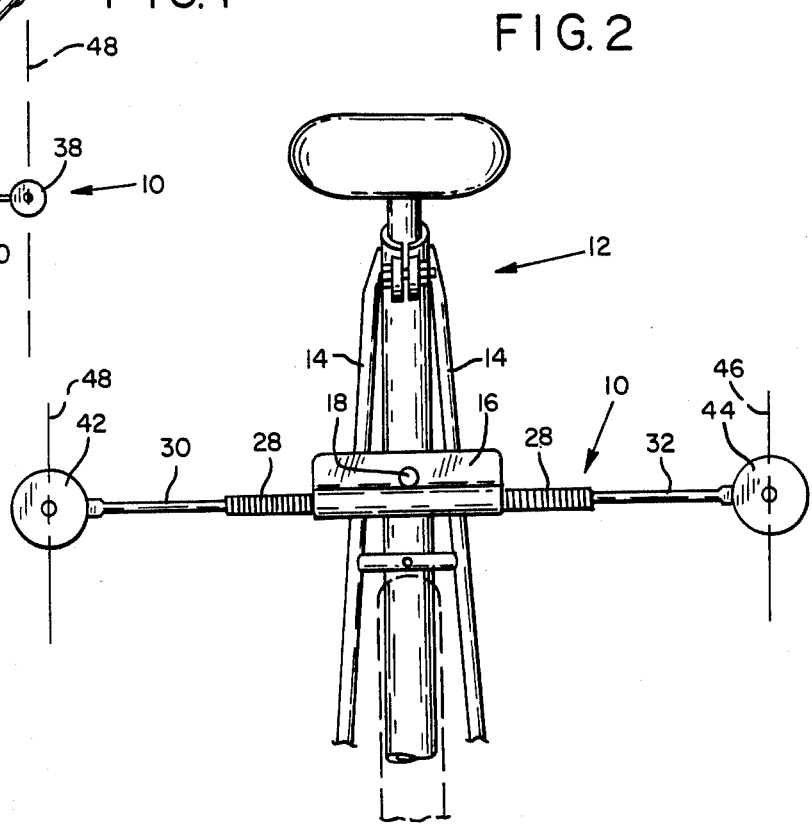
FIG. 2 is an enlarged perspective view of the invention, as mounted on the bicycle frame seat stays.
Figure 3:
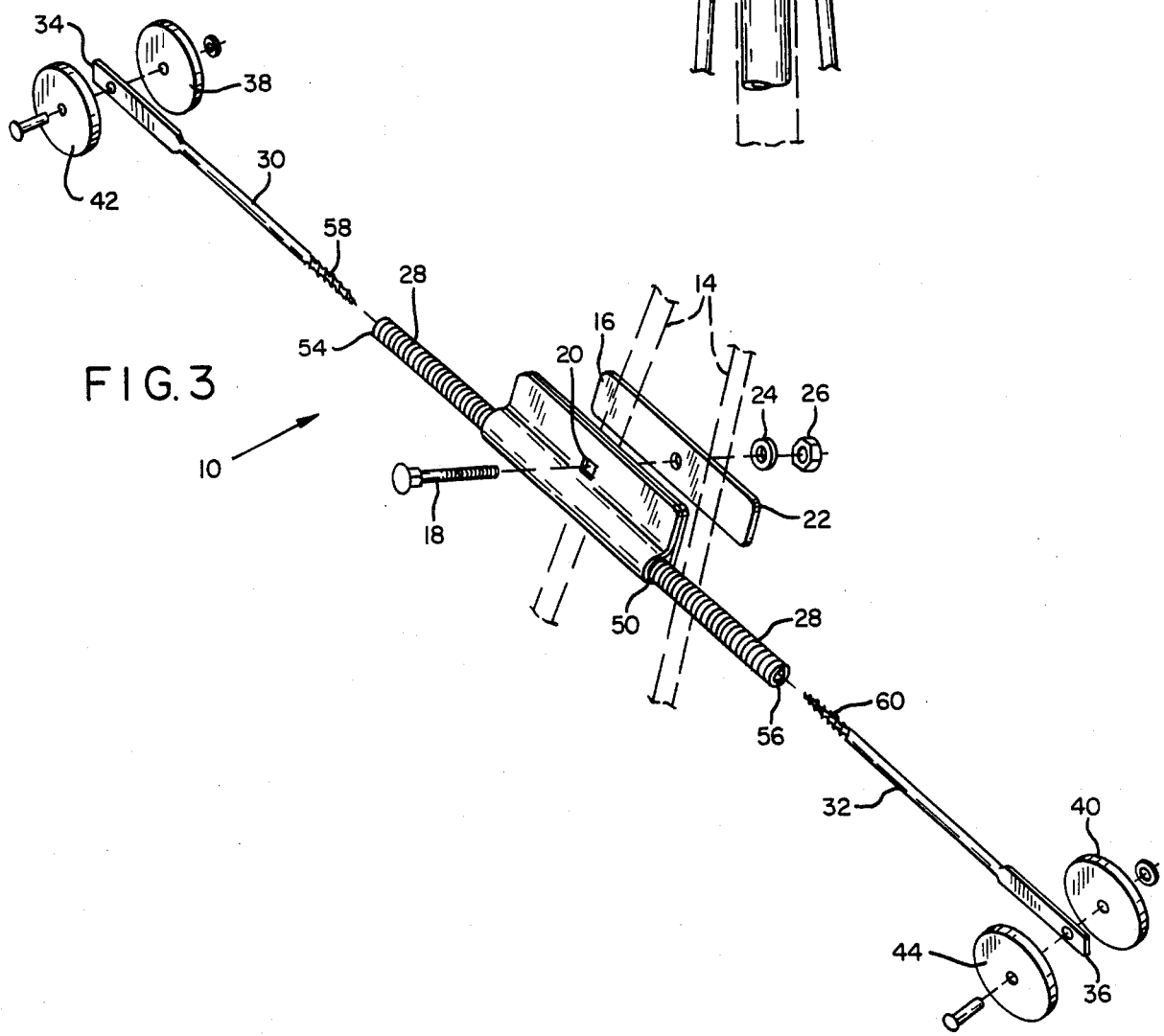
FIG. 3 is a an exploded view, in perspective, of the invention.

Referring now to the drawings, in FIG. 1 there is shown the preferred embodiment of the bicycle reflector safety device 10 mounted on a bicycle 12, as viewed from the front. The preferred position for mounting is on the seat stays 14, where the device 10 can be mounted securely without interfering with the operation of the bicycle. As illustrated in FIG. 2 and FIG. 3, the mounting member 16 is secured to the seat stays 14 by means of a bolt 18 penetrating a hole 20 in the mounting member 16, then passing through a backing plate 22, where it is secured by a lockwasher 24 and nut 26, the tightening of the nut 26 pulling the mounting member 16 and the backing plate 22 together tightly against the seat stays 14, thus attaching the device securely to the bicycle. As can be seen in FIG. 1 and FIG. 2, the mounting member 16 is oriented so that the spring member 28 and the attached and extending reflector support rods 30 and 32 are equidistant from the ground and in an approximately horizontal position. At the ends 34 and 36 of the reflector support rods 30 and 32 are attached non-red forward reflectors 38 and 40, preferably amber or white according to current convention, oriented to be viewed from the front of the bicycle, and red rearward reflectors 42 and 44, oriented to be viewed from the rear. In order to define the outer dimensions 46 and 48 of the bicycle, the reflectors are in a position equal with or outside of the outer dimensions 46 and 48.

Referring now to FIG. 3 in greater detail, one can gain a better appreciation of the ruggedness and simplicity of the present design. FIG. 3 provides an exploded view of the preferred embodiment of the device.

The mounting member 16, preferably constructed of metal, is formed so that it includes an offset bight 50 of generally circular shape. A single helical expansion spring member 28, is centered within the mounting member 16 and is firmly clamped therein by the tightening of nut 26 on bolt 18, thus fixing the spring member 28 in the desired position. The tightening of nut 26, as previously described, also attached the mounting member 16 to the frame seat stays 14 of the bicycle. While two separate spring members, welded or otherwise securely attached to the mounting member 16, would also be satisfactory, and do provide an alternative configuration for this invention, a single spring which joins both sides of the device together was found to be preferably due to its inherent strength and ruggedness, to include the inability for the installed spring member 28 to become separated from the mounting member 16, when mounted on the bicycle.

The ends 54 and 56 of the spring member 28 preferably extend approximately 2 to 2½ inches beyond the ends of the mounting member 16. Such length of spring provides the flexibility and resiliency desired without the tendency to droop or vibrate that a longer spring could impart. On the other hand, a longer spring would not be unsatisfactory, and, in fact, is the basis for an alternative configuration which is discussed later.

The reflector support rods 30 and 32 are joined to the spring ends 54 and 56 by a helical, thread-like attachment means 58 and 60, as illustrated. This preferred method of attachment provides significantly greater joint strength than the simple pressing of a smooth rod into the spring ends, and in addition, permits a simple adjustment of the reflectors to a vertical orientation by the rotation of the reflector support rods 30 and 32. Thus any angle, with respect to the vertical, that the seat stays 14 are constructed on the bicycle by its manufacturer, can be accomodated by the present invention. The reflector support rods 30 and 32 are of equal length, that length determining the spacing of the reflectors. It is anticipated that several lengths of reflector support rods 30 and 32 would be available to correspond to bicycles of varying width.

Finally, attached to the outer ends 34 and 36 of the reflector support rods 30 and 32 are the non-red forward reflectors 38 and 40, and red rearward reflectors 42 and 44, oriented as previously described. Either a simple nut and bolt, or rivet, attachment of these reflectors onto the the reflector support rods 30 and 32 is satisfactory. The preferred reflectors are those of high reflectivity with a diameter of two inches or greater, such as the "STA-LITE 25" reflectors. While separate non-red forward reflectors 38 and 40 and red rearward reflectors 42 and 44 are used in the preferred embodiment, a single reflector with a non-red reflective surface on one side and a red reflective surface on the other side would be satisfactory, and could even become preferred, depending on their durability and the economies involved.

It should be noted that the colors of the reflectors themselves are not a part of this invention, and where it is indicated that red corresponds to rearward reflectors and non-red, preferably white or amber, corresponds to the forward reflectors, this is done in the belief that these are the appropriate colors under generally accepted traffic rules and regulations. The colors of the reflectors would, of course, comply with the law.

An additional alternative configuration to the preferred embodiment, where a single spring member 28 is used, involves the elimination of reflector support rods 30 and 32 and the substitution of additional length of the single spring member 28 so as to achieve the same total width of the device. In this alternative configuration, each end of the elongated single spring member is further extended by a straightened portion of the spring for a distance equal to or slightly greater than the radius of the reflectors being used, and this straight portion then is culminated in a small loop or pigtail through which the reflectors are attached, as in the preferred embodiment. The loops or pigtails are oriented in the same plane; adjustment to the vertical is achieved by correct orientation of the single spring member 28 within the mounting member 16 before the position of the spring 28 is fixed by the clamping action achieved by tightening nut 26 on bolt 18. While this simplified configuration is not specifically illustrated in the drawings, it is believed that the above description clearly and adequately defines this single spring without support rod alternative.

The sturdiness and ruggedness of the bicycle reflector safety device, in view of its important safety function combined with the environment in which it may be used, especially by children, is considered to be extremely important and part of the invention herein.

It is thought that the bicycle reflector safety device of the present invention and its many attendant advantages will be understood from the foregoing description and that it will be apparent that various changes may be made in form, construction and arrangement of the parts thereof without departing from the spirit and scope of the invention or sacrificing all of its material advantages, the form hereinbefore described being merely an exemplary embodiment thereof.

I claim:

1. A bicycle reflector safety device, comprising:
    (a) a multi-reflector warning system which comprises:
       two rearward reflectors with their reflective surfaces oriented to the rear of the bicycle so as to be visible from the rear of the bicycle, said reflectors being laterally positioned one on each side of the bicycle so as to be substantially separated and to be located at and define the outer width dimensions of the bicycle; and
       two forward reflectors with their reflective surfaces oriented to the front of the bicycle so as to be visible from the front of the bicycle, said reflectors being laterally positioned one on each side of the bicycle so as to be substantially separated and to be located at and define the outer width dimensions of the bicycle; and (b) means for mounting said reflectors sturdily on the bicycle.

2. The bicycle reflector safety device, as recited in claim 1, wherein the said means for mounting comprises:

(a) a mounting member for attaching the said bicycle reflector safety device to the frame of the bicycle;

(b) a single helical expansion spring member, of greater length than the horizontal dimension of said mounting member, wherein the said spring member is centered on and securely held by said mounting member when attached to the bicycle, so that an essentially equal length of spring extends horizontally beyond the said mounting member toward and on both sides of the bicycle, said spring extension forming a flexible and resilient joint for the protection of the said reflectors and objects which they might strike;

(c) two (2) reflector support rods, one reflector support rod being attached to and supporting the said rearward reflector and the said forward reflector on one side of the bicycle, and the other reflector support rod being attached to and supporting the said rearward reflector and the said red forward reflector on the opposite side of the bicycle; and, (d) means for sturdily and adjustably attaching said two (2) reflector support rods to the said single helical expansion spring.

3. The bicycle reflector safety device, as recited in claim 2, wherein the means for attaching the said reflector support rods to the said single helical expansion spring includes:

a helical thread-like portion on the end of each said reflector support rod, corresponding to the form of the said helical expansion spring, so that the said rods can be inserted into the ends of said helical spring by rotating the said rods to follow the natural contours of the said spring, thus providing a secure attachment thereto, and also permitting the rotational adjustment of the said rods, and thereby of the said attached reflectors, so as to obtain the desired orientation for maximum reflectivity and safety.

4. The bicycle reflector safety device, as recited in claim 1, wherein the said means for mounting comprises:

(a) a mounting member for attaching the said bicycle reflector safety device to the frame of the bicycle;

(b) two (2) helical expansion spring members attached to said mounting member and extending outward therefrom so that an essentially equal length of spring extends horizontally beyond the said mounting member toward and on both sides of the bicycle, said spring extension forming a flexible and resilient joint for the protection of the said reflectors and objects which they might strike;

(c) two (2) reflector support rods, one reflector support rod being attached to and supporting the said rearward reflector and the said forward reflector on one side of the bicycle, and the other reflector support rod being attached to and supporting the said rearward reflector and the said forward reflector on the opposite side of the bicycle; and, (d) means for sturdily and adjustably attaching said two (2) reflector support rods to the said two (2) helical expansion springs.

5. The bicycle reflector safety device, as recited in claim 4, wherein the means for attaching the said reflector support rods to the said two (2) helical expansion springs includes:

a helical thread-like portion on the end of each said reflector support rod, corresponding to the form of the said helical expansion springs, so that the said rods can be inserted into the outer ends of said helical springs by rotating the said rods to follow the natural contours of the said springs, thus providing a secure attachment thereto, and also permitting the rotational adjustment of the said rods, and thereby of the said attached reflectors, so as to obtain the desired orientation for maximum reflectivity and safety.

6. The bicycle reflector safety device, as recited in claim 1, wherein the said means for mounting comprises:

(a) a mounting member for attaching the said bicycle reflector safety device to the frame of the bicycle, said mounting member including an attaching clamp for a helical expansion spring; and, (2) a single helical expansion spring member, wherein the said spring member is centered on and securely held with the said spring attaching clamp of said mounting member when attached to the bicycle, so that an essentially equal length of spring extends horizontally beyond said mounting member and on both sides of the bicycle, said spring extension forming a flexible and resilient joint for the protection of said reflectors and objects which they might strike; the outer ends of said single helical expansion spring being formed for direct and parallel attachment of the said reflectors;

wherein the said single helical expansion spring can be rotated within the said mounting member clamp, when said clamp is in a loosened state, thereby permitting simultaneous rotational adjustment for the said reflectors so as to obtain the desired orientation for maximum reflectivity and safety.

* * * * *